July 27, 1926.
DE LYNNE TURVEY ET AL
1,594,283
GEAR SHIFT CONTROL DEVICE FOR AUTOMOBILES
Filed August 11, 1924   3 Sheets-Sheet 3
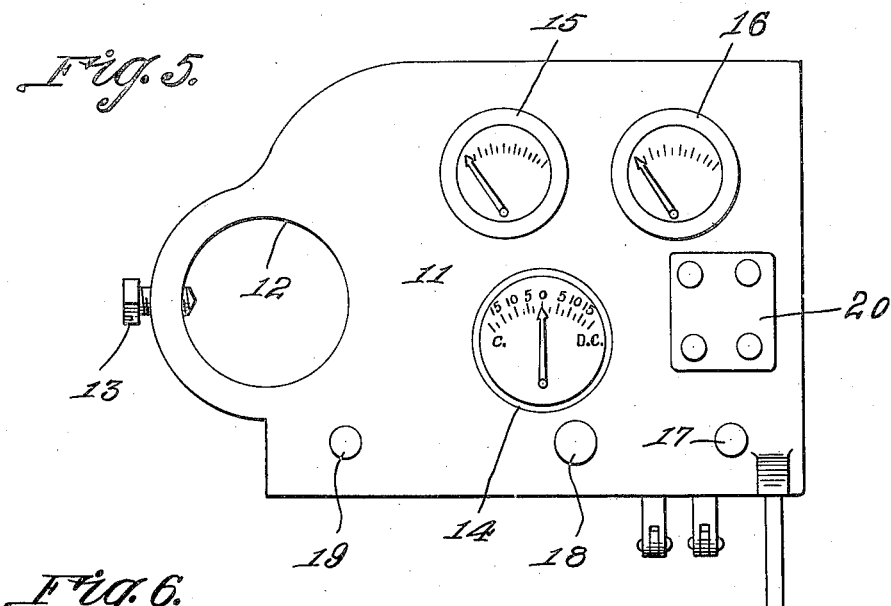
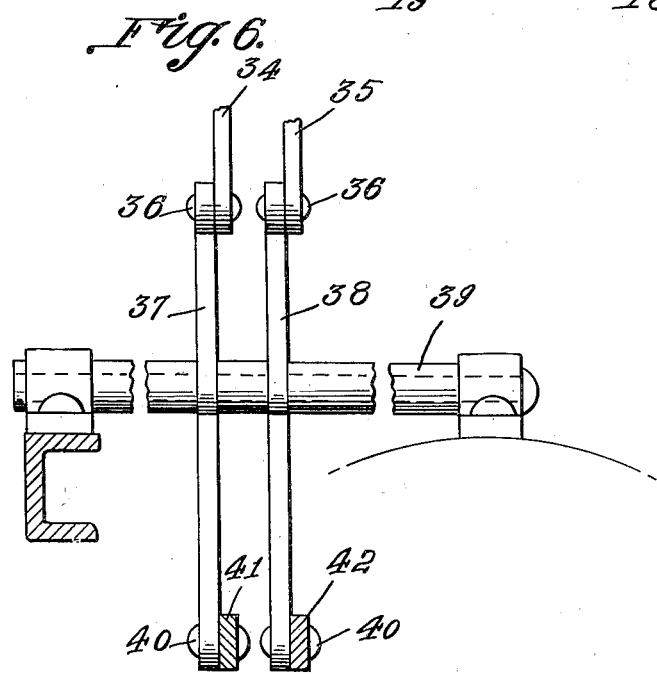
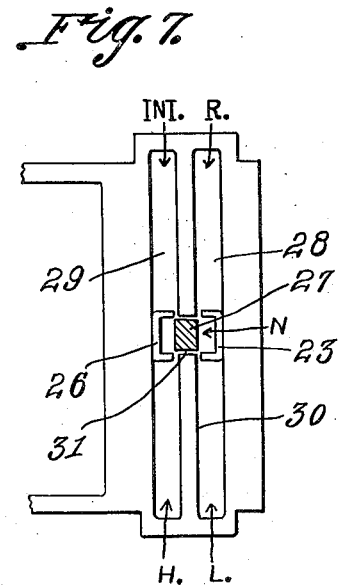
De Lynne Turvey
J. D. Reed
INVENTOR
BY Victor J. Evans
ATTORNEY
WITNESS:

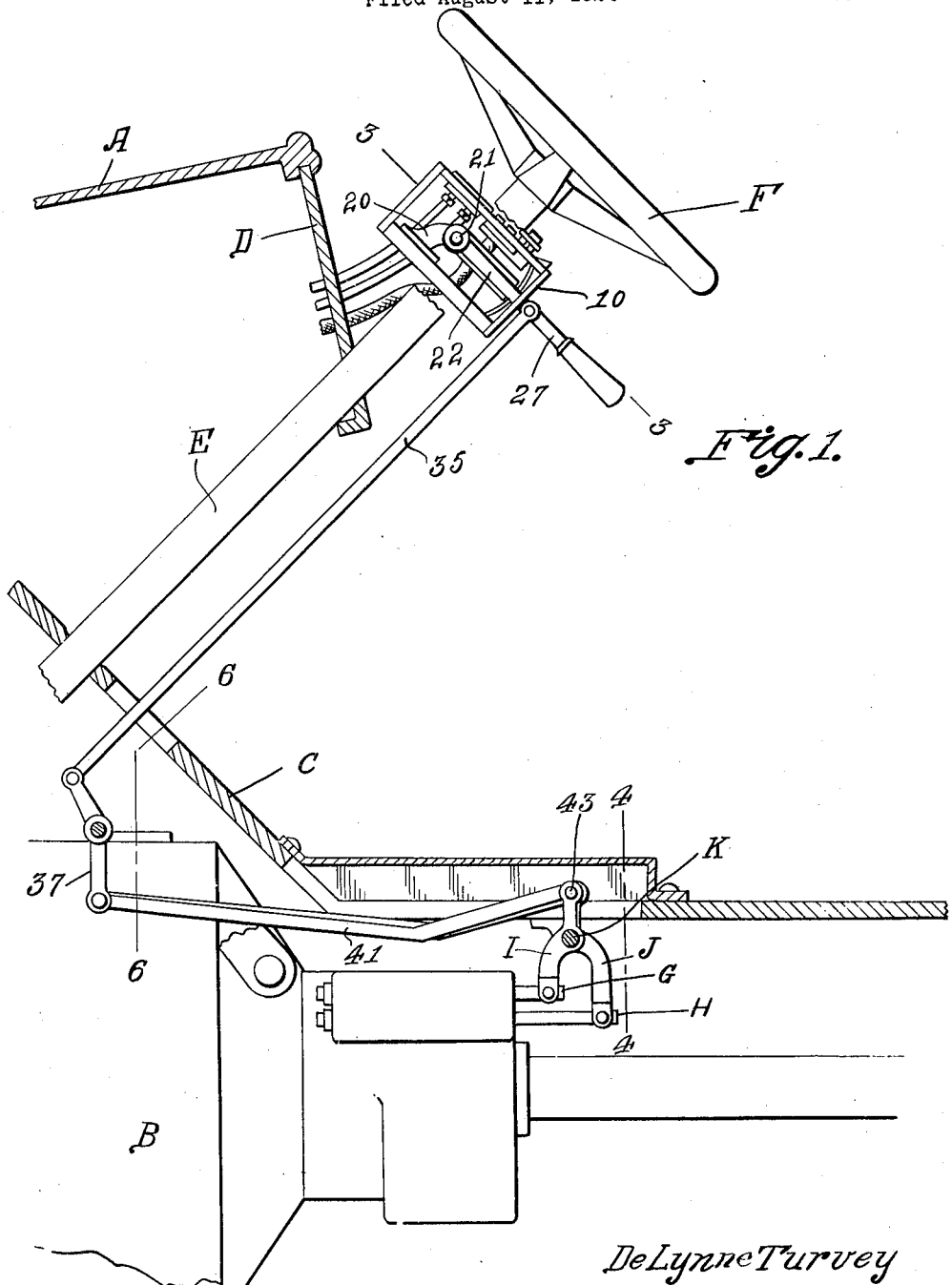

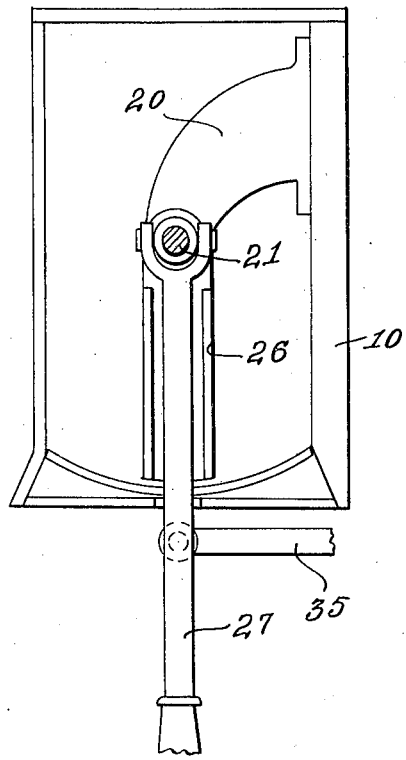
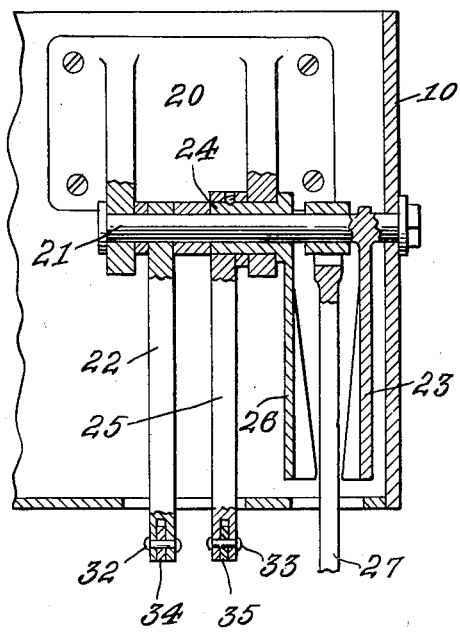
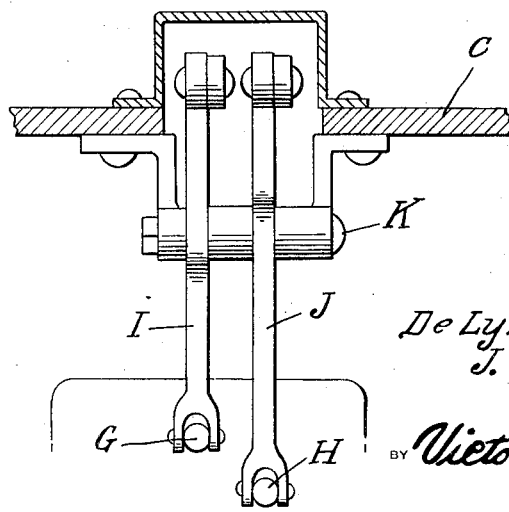

Patented July 27, 1926.

1,594,283

UNITED STATES PATENT OFFICE.

DE LYNNE TURVEY AND JOHN D. REED, OF MINERAL CITY, OHIO.

GEAR-SHIFT CONTROL DEVICE FOR AUTOMOBILES.

Application filed August 11, 1924. Serial No. 731,471.

This invention relates to control devices for motor vehicles and has for its object the provision of a novel gear shift device which is mounted beneath the steering wheel and which is readily operable for controlling the gears in the transmission, the device having the great advantage of eliminating the usual upstanding lever which is located on the floor of a car in advance of the front seat.

An important object is the provision of a control device which being located at the point specified will be very convenient to reach inasmuch as it will be unnecessary for the operator to lean over and fumble for the control lever as is the case in the ordinary construction.

A further object is the provision of a control mechanism including such a control lever and including all the other auxiliary instruments such as an ammeter, oil gauge and the like, all these elements being brought together and mounted upon a single control board which is located beneath the steering wheel.

An additional object is the provision of a device of this character which will be comparatively simple and inexpensive in manufacture, and installation, easy to control and operate, positive in action, efficient and durable in service, and a general improvement in the art.

With the above and other objects and advantages in view, the invention consists in the details of construction to be hereinafter more fully described and claimed, and illustrated in the accompanying drawings, in which:

Figure 1 is a fragmentary vertical sectional view taken through the front portion of a motor vehicle and illustrating our device in applied position.

Figure 2 is a detail side elevation of the control device with certain parts omitted for the sake of clearness.

Figure 3 is a detail sectional view taken on substantially the line 3—3 of Figure 1.

Figure 4 is a sectional view taken on the line 4—4 of Figure 1.

Figure 5 is a plan view of the control device removed from the steering post.

Figure 6 is a detail sectional view taken substantially on the line 6—6 of Figure 1, and Figure 7 is a detail view of the guide device for the control lever.

Referring more particularly to the drawings, the letter A designates a portion of an automobile having the usual transmission B, floor C, instrument board D, and steering post or column E carrying the usual steering wheel F.

The transmission B is not illustrated in detail as it is believed that it is sufficient to state that it is of the sliding gear type in which the gears are shifted by means of a pair of longitudinally slidable rods G and H operated by means of levers I and J respectively pivoted upon a common axis K.

It is well known that it is the ordinary practice to provide an upstanding lever mounted at or near the center of the front floor board in advance of the front seat and having a universal joint mounting of a more or less socket-like nature whereby the lever may be shifted to control the shifting of the gears within the transmission case. In order to avoid the employment of such a lever, we provide a control device which is located on the steering post or column beneath the wheel and which will therefore be more convenient inasmuch as it is unnecessary for the operator to lean over and grasp such a control lever as is ordinarily provided.

In carrying out our invention we provide a suitable supporting frame or casing 10 which is adapted to be supported upon the steering post or column and which casing or frame carries a top or cover plate 11 having an opening 12 for the reception of the steering post. Intersecting the opening is a set screw 13 which is designed to be screwed up tightly against the steering post or column for locking the device rigidly in place. If desired, any other suitable holding means might be provided in addition to the set screw or in place of it, if desired. This top or cover plate 11 serves as a support for all the instruments which are needed in the operation of the car and we have illustrated these various instruments, 14 representing the ammeter, 15 the gasoline gauge, 16 an oil splash or pressure gauge. Also mounted upon this cover plate is a control button 17 for the horn, a button 18 for effecting priming, and a cutout regulator 19. The numeral 20 designates the switch assembly for controlling not only the light on the car but also the ignition. In this way it is evident that all the control devices are arranged in very compact form and close together so that the operator may see practically all of them at a glance.

Within the frame or casing 10 is a supporting bracket structure 20 within which is journaled a shaft 21 carrying arms 22 and 23. Engaged upon and rotatable with respect to this shaft is a sleeve 24 carrying arms 25 and 26. The arms 23 and 26 are of concavo-convex form in cross section and are located or arranged with their concaved sides toward each other. Rotatably engaged upon the shaft 21 and located between the arms 23 and 26 is an operating lever 27 which is capable of being engaged with either the arm 23 or the arm 26, as the case may be, depending upon the desired gear. Instead of describing the arms 23 and 26 as concavo-convex in cross section, they might be described as being channel shaped and of such size as to have the lever 27 engaged within them.

The lever 27 is capable of having limited lateral or rocking movement and in order to guide it properly in the desired direction we make use of a guide plate 28 which is secured to or formed integrally upon the frame or casing 10 and which is formed with a pair of spaced slots 29 and 30 connected by an intermediate portion 31 so as to define the well known H-type of slot.

Pivotally connected with the arms 22 and 25 as shown at 32 and 33 respectively, are rods 34 and 35 which extend downwardly beneath and in spaced relation to the steering post or column E. At their lower ends, the rods 34 and 35 are pivotally connected at 36 with double ended levers 37 and 38 which are in turn pivoted on a rod 39 or the like supported in any desired manner from the frame of the car or the transmission case. Pivotally connected at 40 with the lower ends of the levers 37 and 38 are rearwardly extending links or rods 41 and 42 which are pivotally connected at 43 with the upper ends of the levers I and J respectively.

In the operation of the mechanism, it will be seen that if it is desired to throw the transmission into reverse gear, it is necessary for the operator to grasp the lever 27, move to the right so as to engage it within the channel shaped arm 23 and then move it upwardly to the upper end of the slot 28. When the lever is thus moved, it is apparent that the arm 23 will be correspondingly moved and this will effect rotation of the shaft 21 upon which is rigidly secured the arm 22. The movement is consequently imparted to the arm 22, link or rod 34 and link or rod 41 so that the lever I will be moved to shift the rod G in such a manner as to mesh the reverse gears in the transmission.

If it is desired to throw the transmission into low gear, the lever 27 is moved to the right and moved downwardly to the lower end of the slot 28 whereupon the shaft 21 will be rotated in the reverse direction and the lever I moved in a direction opposite to that above described owing to the provision of the connecting links 34 and 41 and the lever 37.

If it is desired to throw the transmission into intermediate gear, the lever 27 is swung to the left so that it will be engaged within the arm 26 and it is then moved upwardly to the upper end of the slot 29. When this is done the sleeve 24 carrying the arm 26 will be turned and also the arm 25 will be turned and the movement imparted to the arm 25 will cause corresponding movement of the depending rod or link 35, rocking of the lever 38, movement of the link 42 and swinging of the lever J which controls the proper gear within the transmission case. Similarly, if it is desired to throw the transmission into high gear, the lever 27 is moved to the left and then downwardly to the lower end of the slot 29 whereupon the result will be that the lever J will be moved in the opposite direction for meshing the gears giving the direct or high gear drive.

From the foregoing description and a study of the drawings it will be apparent that we have provided a simply constructed and easily operated and very convenient gear shift mechanism which entirely avoids any necessity for having the upstanding lever at the center of the floor. In this way it is evident that there is very little to get in the way and the driving of a car will be greatly facilitated on account of the convenience.

While we have shown and described the preferred embodiment of the invention, it should of course be understood that we reserve the right to make such changes in the form, construction and arrangement of parts as will not depart from the spirit of the invention or the scope of the subjoined claims.

Having thus described the invention, we claim:—

In an automobile transmission control mechanism, a selective gear transmission including rearwardly extending control rods, a transverse supporting element, a pair of arm members pivoted upon said supporting element and pivotally connected with said rods, the floor boards of the vehicle above said arms and transmission mechanism being formed with elongated slots, forwardly extending links pivotally connected with said arms, a transverse supporting element, an angle lever pivotally mounted upon the second named supporting element for each of said forwardly extending links, a frame structure secured with respect to the steering column and located immediately beneath the steering wheel, and levers pivotally mounted within said frame structure and having connected therewith downwardly inclined links pivotally connected with said angle levers whereby upon manipulation of the last named levers the rods of the transmission control mechanism may be moved longitudinally.

In testimony whereof we affix our signatures.

DE LYNNE TURVEY.
JOHN D. REED.